(12) United States Patent
Sweet et al.

(10) Patent No.: US 7,565,643 B1
(45) Date of Patent: *Jul. 21, 2009

(54) SENDING NOTIFICATIONS TO PROJECT MEMBERS IN A PROJECT MANAGEMENT SYSTEM

(75) Inventors: Nancy Lee Sweet, San Juan Capistrano, CA (US); Avinash Sadhu, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 992 days.

This patent is subject to a terminal disclaimer.

(21) Appl. No.: 10/636,946

(22) Filed: Aug. 6, 2003

Related U.S. Application Data (63) Continuation-in-part of application No. 10/306,604, filed on Nov. 26, 2002, now Pat. No. 7,155,700, and a continuation-in-part of application No. 10/306,601, filed on Nov. 26, 2002, now Pat. No. 7,159,206, and a continuation-in-part of application No. 10/306,602, filed on Nov. 26, 2002, now Pat. No. 7,174,348.

(60) Provisional application No. 60/456,376, filed on Mar. 20, 2003.

(51) Int. Cl.
G06F 9/44 (2006.01)
G06F 15/16 (2006.01)

(52) U.S. Cl. .................. 717/121; 717/102; 717/122; 709/206

(58) Field of Classification Search ......... 717/100–121; 707/10; 709/203–207
See application file for complete search history.

(56) References Cited

U.S. PATENT DOCUMENTS

| 7,024,459 | B2 * | 4/2006 | McNamara et al. | 709/206 |
|---|---|---|---|---|
| 7,155,700 | B1 * | 12/2006 | Sadhu et al. | 717/103 |
| 7,159,206 | B1 * | 1/2007 | Sadhu et al. | 717/101 |
| 2002/0019827 | A1 * | 2/2002 | Shiman et al. | 707/200 |
| 2002/0138522 | A1 * | 9/2002 | Muralidhar et al. | 707/526 |
| 2003/0023675 | A1 * | 1/2003 | Ouchi et al. | 709/203 |
| 2003/0097361 | A1 * | 5/2003 | Huang et al. | 707/10 |
| 2003/0233438 | A1 * | 12/2003 | Hutchinson et al. | 709/223 |

OTHER PUBLICATIONS

Avi Sadhu, Unisys Corporation, Rein In That Monster Of A Process With Modern Web-Based Tool, Project World Conference, San Jose, California, Dec. 13, 2001.

* cited by examiner

Primary Examiner—Chuck O Kendall
(74) Attorney, Agent, or Firm—James E. Goepel; Robert P. Marley; Phuong-Quan Hoang (57) ABSTRACT

An embodiment of the present invention is a technique to send notification to members in a project management system. A notification list and information are created for a project. The notification list and information are stored in a repository. A notification request is received from a component in the project management system. The notification request is processed at run-time using the notification list and information.

24 Claims, 9 Drawing Sheets

SENDING NOTIFICATIONS TO PROJECT MEMBERS IN A PROJECT MANAGEMENT SYSTEM

CROSS-REFERENCE TO RELATED APPLICATIONS

This application is a continuation-in-part application of the following patent applications: "Creating Customized Objects For Processes In Project Management", Ser. No. 10/306,604, filed on Nov. 26, 2002 now U.S. Pat. No. 7,155,700; "Automated Process Execution For Project Management", Ser. No. 10/306,601, filed on Nov. 26, 2002 now U.S. Pat. No. 7,159,206; "Collaborating Activities Using Customized Objects For Project Management", Ser. No. 10/306,602, filed on Nov. 26, 2002 now U.S. Pat. No. 7,174,348. This application claims the benefit of the provisional application entitled "Project Management Using Customized Objects", Ser. No. 60/456,376 filed on Mar. 20, 2003, and is related to the following patent applications: Ser. No. 10/636,924 entitled "Generation Of Java Language Application Programming Interface For An Object-Oriented Data Store"; Ser. No. 10/636,959 entitled "Capturing Traceability Information Between Artifacts Produced By A Project Management Software"; Ser. No. 10/636,955 entitled "Instantiating A Project In A Project Management System"; Ser. No. 10/636,923 entitled "Automating Document Reviews In A Project Management System"; Ser. No. 10/636,961 entitled "Implementing Web-Based Wizards In Distributed Web Applications"; Ser. No. 10/636,962 entitled "Implementing Complex Client-Side Graphical User Interface Controls In Distributed Web Applications"; Ser. No. 10/636,951 entitled "Synchronizing Data Between A Data Store And A Project Management Client Tool"; Ser. No. 10/636,852 entitled "Tracking Status Of Task In A Project Management Tool"; Ser. No. 10/636,953 entitled "Customizing And Automating Checklists In Project Management"; Ser. No. 10/636,952 entitled "Controlling Access To Projects In A Project Management System"; Ser. No. 10/636,945 (entitled "Customizing And Automating Entry And Exit Criteria In A Project Management System", all filed on the same date and assigned to the same assignee as the present application, the contents of each of which are herein incorporated by reference.

BACKGROUND

1. Field of the Invention

Embodiments of the invention relate to the field of management software, and more specifically, to project management.

2. Description of Related Art

Project management is becoming more and more complex. In enterprise applications, the sizes of projects are typically quite large, including complex databases and involving a large number of participants. The complex interactions among the various team members, process flows, tools, and databases have created difficulties to project managers. The project manager has to keep track of the progress of the project, communicate with stake holders, during the initiation, planning, executing, controlling, and closing phases of a project. Team members have to use the tools of the trade, exchange ideas, generate and review project documentations and/or reports, update information, communicate with the project manager regarding progress of their work, etc.

Existing techniques for project management have a number of drawbacks. First, most traditional techniques are not convenient to users or team members because of lack of support and/or interface to Web-based information sharing. Second, the project information may not be well structured or organized. Users do not have a common format or platform to organize data or information and trace sources of data and information. Third, workflow/process automation is non-existent.

As the project progresses, status of tasks or phases of the project changes such as task completion, specification changes, checklist completion, etc. Communication of these changes, has to be done in a timely manner. Project team members therefore need to be informed or notified of these events as soon as possible so that they can manage their part of the workflow/process accordingly. Existing techniques are either manual in nature, relying on individual inquiries to the system or lack the desired level of automation. These techniques are slow, tedious, error-prone, and inefficient.

SUMMARY OF THE INVENTION

An embodiment of the present invention is a technique to send notification to members in a project management system. A notification list and information are created for a project. The notification list and information are stored in a repository. A notification request is received from a component in the project management system. The notification request is processed at run-time using the notification list and information.

BRIEF DESCRIPTION OF THE DRAWINGS

The invention may best be understood by referring to the following description and accompanying drawings that are used to illustrate embodiments of the invention.

In the drawings.

DESCRIPTION

An embodiment of the present invention is a technique to send notification to members in a project management system. A notification list and information are created for a project. The notification list and information are stored in a repository. A notification request is received from a component in the project management system. The notification request is processed at run-time using the notification list and information.

In the following description, numerous specific details are set forth. However, it is understood that embodiments of the invention may be practiced without these specific details. In other instances, well-known circuits, structures, and techniques have not been shown in order not to obscure the understanding of this description.

Figure 1A:
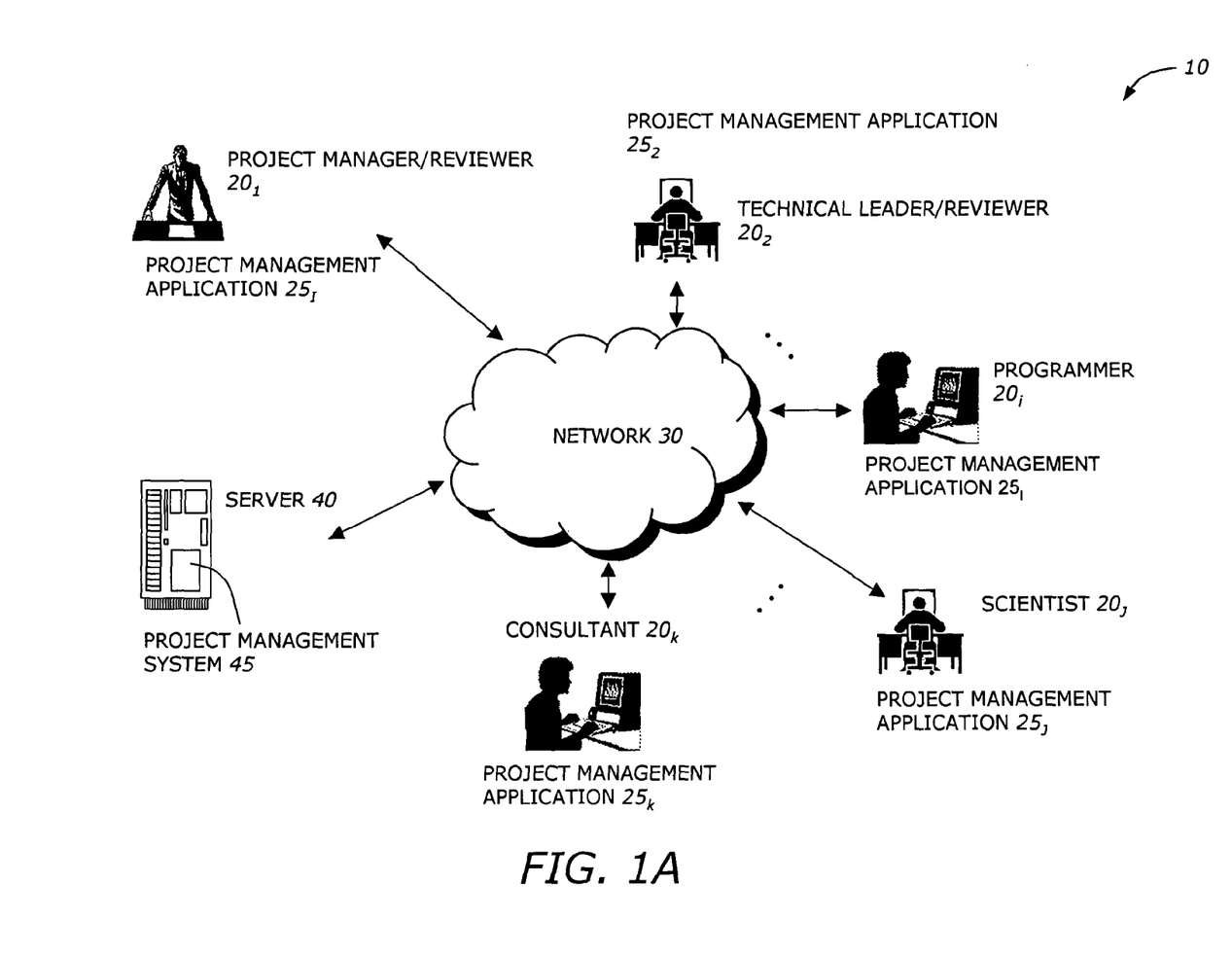
FIG. 1A is a diagram illustrating a project environment in which one embodiment of the invention can be practiced.

FIG. 1A is a diagram illustrating a project environment 10 in which one embodiment of the invention can be practiced. The project environment 10 includes project members $20_I$ to $20_K$, a network 30, and a server 40.

The project members may include a project manager $20_1$, a technical leader $20_2$, a programmer $20_i$, a scientist $20_j$, and a consultant $20_K$. A person may have one or more roles. Each member may be assigned one or more tasks in one or more phases of a project. Each member has access to a project management application $25_i$ to $25_K$, respectively. The project management application may be located in the computer used by the member.

The network 30 may be any suitable network that links the project members $20_I$ to $20_K$. The network 30 may be an Internet, intranet, extranet, wireless fidelity (Wi-Fi), local area network (LAN), wide area network (WAN), etc. The network 30 allows project members to communicate with each other and to access the project management application. The server 40 is connected to the network 30 and contains a project management system 45 that provides the tools for users to construct, create, or instantiate a project.

Figure 1B:
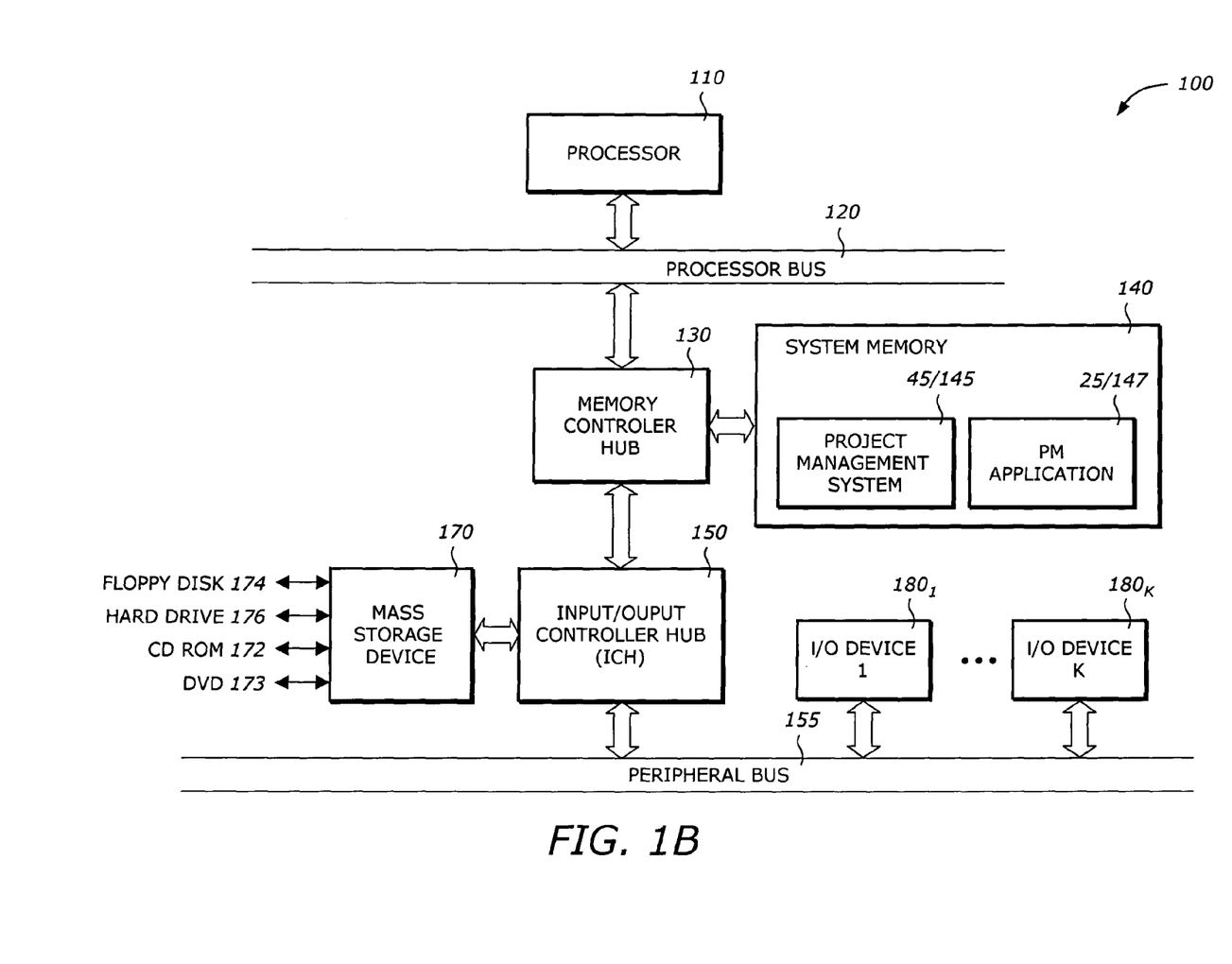
FIG. 1B is a diagram illustrating a computer system according to one embodiment of the invention.

FIG. 1B is a diagram illustrating a computer system 100 in which one embodiment of the invention can be practiced. The system 100 includes a processor 110, a processor bus 120, a memory control hub (MCH) 130, a system memory 140, an input/output control hub (ICH) 150, a peripheral bus 155, a mass storage device 170, and input/output devices $180_I$ to $180_K$. Note that the system 100 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a project management system 45 or application 25. Any one of the elements of the project management system 45 or application 25 may be implemented by hardware, software, firmware, microcode, or any combination thereof. The system memory 140 may also include other programs or data which are not shown, such as an operating system. The project management system 45 or application 25 may implement all or part of the project management functions. The project management system 45 or application 25 may also simulate the project management functions. The project management system 45 or application 25 contains instructions that, when executed by the processor 110, causes the processor to perform the tasks or operations as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, databases, applications, and operating systems. The mass storage device 170 may include compact disk (CD) ROM 172, a digital video/versatile disc (DVD) 173, floppy drive 174, and hard drive 176, and any other magnetic or optic storage devices such as tape drive, tape library, redundant arrays of inexpensive disks (RAIDs), etc. The mass storage device 170 provides a mechanism to read machine-accessible media. The machine-accessible media may contain computer readable program code to perform tasks as described in the following.

The I/O devices $180_I$ to $180_K$ may include any I/O devices to perform I/O functions. Examples of I/O devices $180_I$ to $180_K$ include controller for input devices (e.g., keyboard, mouse, trackball, pointing device), media card (e.g., audio, video, graphics), network card such as Institute of Electrical and Electronics Engineers (IEEE) 802.3, IEEE-1394, IEEE-802.11x, Bluetooth, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
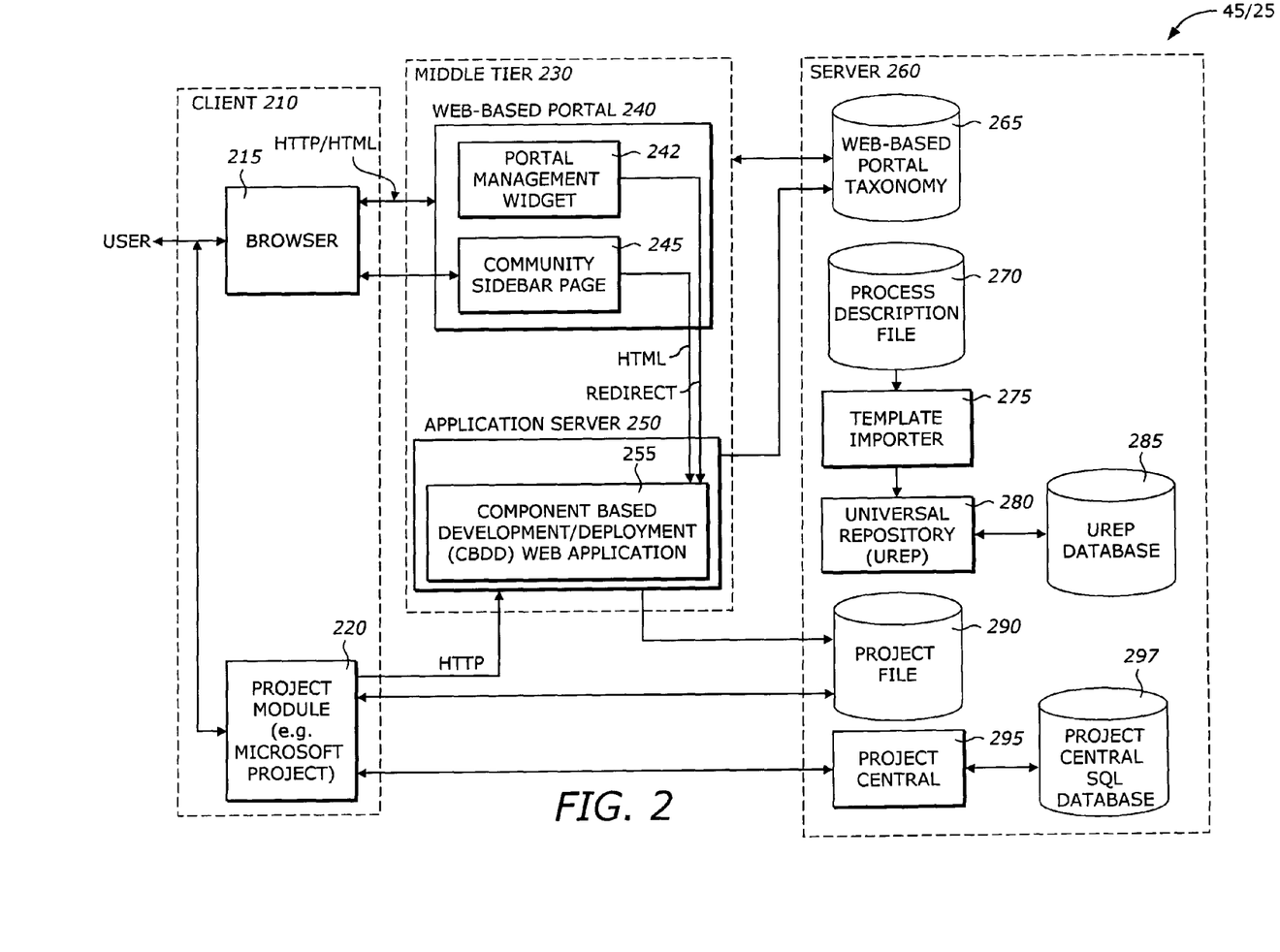
FIG. 2 is a diagram illustrating a project management system/application according to one embodiment of the invention.

FIG. 2 is a diagram illustrating a project management system/application 25/45 according to one embodiment of the invention. The project management system/application 25/45 includes a client 210, a middle tier 230, and a server 260.

The client 210 includes an application accessible to the user or the project team member. The application is typically installed or located at the user's computer system. The client 210 includes a browser 215 and a project module 220. The browser 215 is a Web-based browser that allows the user to navigate the project management system to carry out tasks for project management. The project module 220 is a software or an application designed to provide basic tools for management of projects or workflow. The project module 220 may have any of the following features: creating reports, charts, schedules, calendars; sending and receiving information on project task status and assignment; viewing, editing, and grouping resources; integrating spreadsheets, databases; tracking project progress; etc. In one embodiment, the project module 220 is the Microsoft Project Central, Project 2000 software package.

The middle tier 230 may be implemented at the client 210 or the server 260 and includes a web-based portal 240 and an application server 250. The web-based portal 240 provides tools to manage links for navigation in a Web-based environment. The web-based portal 240 includes a portal management widget 242 and a community sidebar page 245. The portal management widget 242 is in essence a Hyper-Text Markup Language (HTML) file that contains HTML code. It is a set of related links that can appear on a user's portal page and provides links to other components, such as project frame set page when used for portal maintenance, and new project web wizard for initial project configuration. The community sidebar page 245 provides links to the project module database, and to the project frame set page when used for on-going project management. The application server 250 is an enterprise software that provides application infrastructure for the overall project management system such as CBDD. It serves as an interface layer between the user interface and the system databases and/or other server components. In one embodiment, the application server 250 is the WebLogic server which provides basic application server functions and services such as transaction management, security, messaging, database connectivity, resource pooling, etc. Typically, the application server 250 is fully compliant with the industry standard, such as Java 2 Enterprise Edition (J2EE) version 1.3, and is portable across various hardware and operating systems including UNIX, Linux, Windows, etc. The application server 250 supports programming standards to build an application infrastructure, including eXtensible Markup Language (XML), Simple Object Access Protocol (SOAP), Web Services Definition Language (WSDL), etc. The CBDD web application 255 uses the services of the application server 250 to provide a user interface and application logic for the present invention.

The server 260 provides functions at the server side. The server 260 includes a web-based portal taxonomy 265, a process description file 270, a template importer 275, a universal repository (UREP) 280, a UREP database 285, a project file 290, a central project module 295, and a project database 297. The web-based portal taxonomy 265 provides tools to create or publish documents to any topic of the newly generated taxonomy. The taxonomy generation may include generation of elements for various phases in a project such as requirement phase, feasibility phase, design phase, development phase, integration and qualification phase, and support phase. The process description file 270 includes files that are created by user to describe elements of the project. The template importer 275 is a utility to import a process template into the UREP 280 and create the corresponding objects and references needed to represent that process in the UREP 280. The template importer 275 is also used to import global data which are not project-related. Examples of global data include module level notifications and global access control functions. In one embodiment, the process template data is expressed as a XML file. The UREP 280 is a metadata database, a data store, or repository information model that defines the information that can be stored in the repository database 285. It may also identify the services, tool, and technology models supported by the system. The UREP database 285 is a metadata database that stores the repository information. Note that the term repository refers to any type of data store, storage, database, etc.

The project file 290 is a directory that saves generated project files. The project file is used to manage tasks, assignments, and schedules inside the project module 220. The central project 295 is a project management software module that is located at the server. The project central database 297 stores files, information, and data used by the central project 295. In one embodiment, the central project 295 is the Microsoft Project Central.

Figure 3:
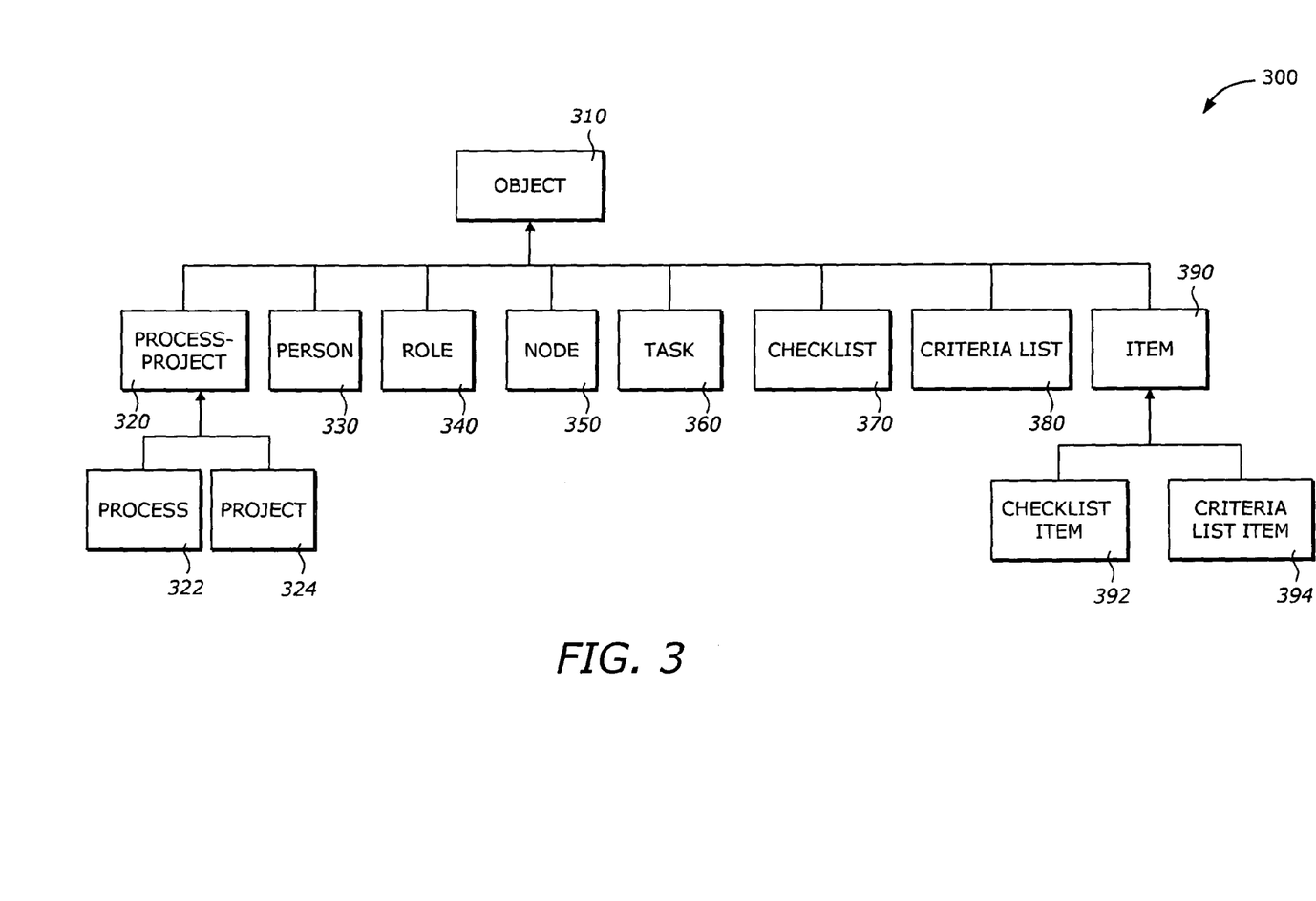
FIG. 3 is a diagram illustrating a hierarchical project model according to one embodiment of the invention.

FIG. 3 is a diagram illustrating a hierarchical project model 300 according to one embodiment of the invention. The hierarchical project model 300 is a CBDD repository model that stores the process and project configurations. It includes several supertypes or types defined for the project management. In one embodiment, these types include a supertype Object 310, a type Process-Project 320, a type Person 330, a type Role 340, a type Node 350, a type Task 360, a type CheckList 370, a type CriteriaList 380, and a type Item 390. The type Process-Project 320 has a subtype Process 322 and a subtype Project 324. The type Item 390 has a subtype CheckList Item 392 and a subtype CriteriaList Item 394.

The supertype Object 310 allows common features, such as name, to be defined once for its subtypes.

The type Process-Project 320 is a supertype of the Process 322 and the Project 324. It allows common features of these types to be defined once. The Process 322 represents a complete or entire process used to run a project. Usually, a process is defined once and is used for many projects. The Project 324 models a real-world project that the team is working on. Person 330 represents a person, a team member, a user, a project member, or an entity who is assigned to carry out a project task. The Role 340 models similar jobs or roles performed by various project members. Examples of roles are programmer, technician, project manager, draftsman, etc. The Node 350 represents a phase, a category, or an activity of a project. The Task 360 represents the actual work items that project members carry out. Examples of tasks are installation of test routines, verification of algorithm correctness, optimization of codes, etc. Tasks typically belong to a particular phase represented by the Node 350. CheckList 370 provides for lists of items that are checked off as a project is completed. The CriteriaList 380 provides for lists of entry and exit criteria that are accomplished before a project transitions from one phase to another phase. The Item 390 provides a supertype for the CheckList Item 392 and the CriteriaList Item 394. It allows common features of these types to be defined once. The CheckList Item 392 represents the individual checklist items contained in a checklist. The CriteriaList Item 394 represents the individual criteria contained in a criteria list. The criteria may include entry and exit criteria.

During project development, status of project components may change as result of various events such as task completion, requirements updates, entry/exit criteria completion, etc. Notifications in the project management system are in the form of email notification. As is known by one skilled in the art, other forms of notification may also be employed. Examples of other forms include voice message transmission, wireless message transmission, etc. In one embodiment, the JavaMail application programming interface (API) is utilized for the construction and sending of notifications.

Figure 4:
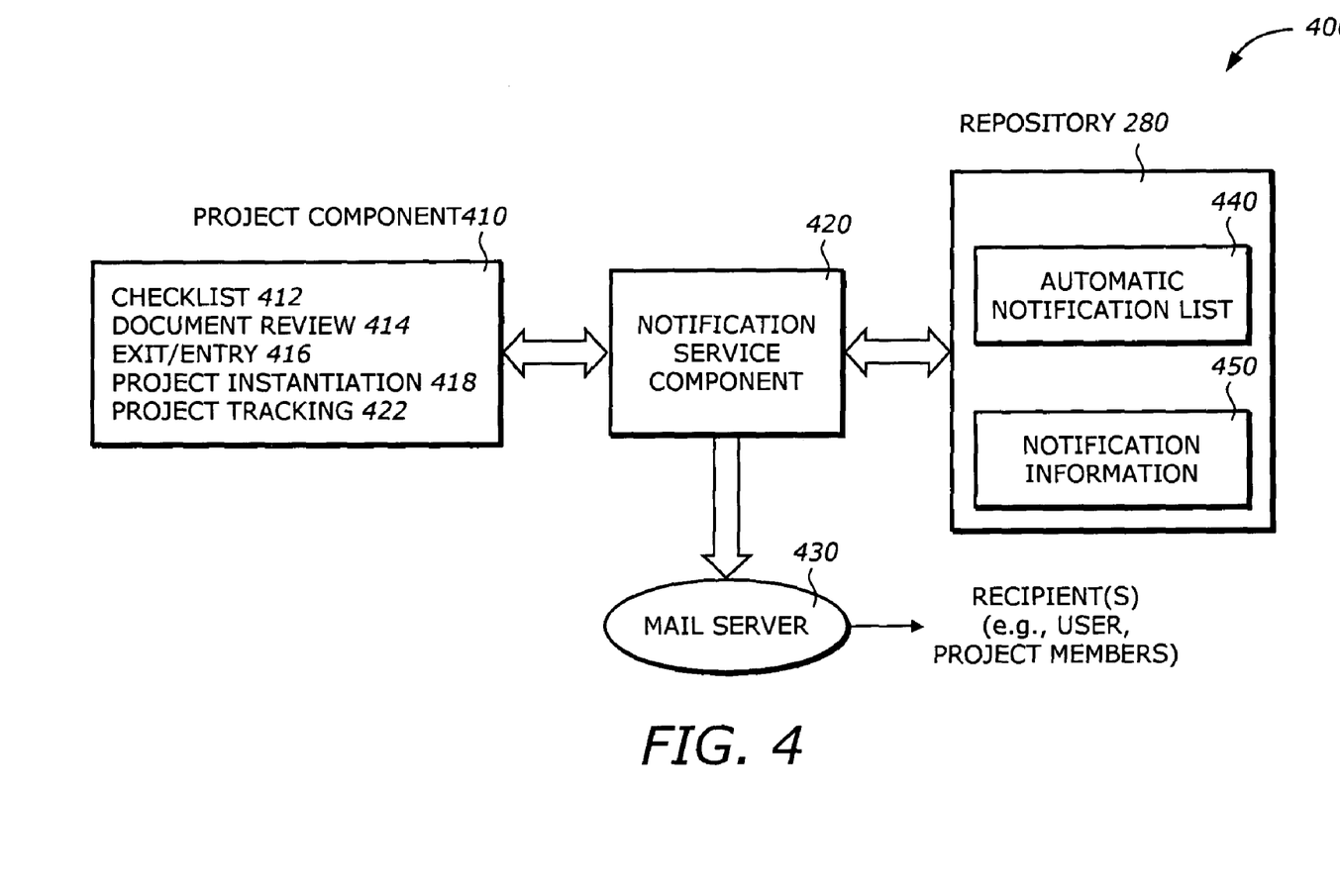
FIG. 4 is a diagram illustrating a design model for the notification according to one embodiment of the invention.

FIG. 4 is a diagram illustrating a design model 400 for the notification according to one embodiment of the invention. The design model includes a project component 410, a notification service component 420, a mail server 430, and the repository 280.

The project component 410 is a component in the project management system that generates a notification request when an event occurs. The project component 410 may be any one of a checklist component 412, a document review component 414, an entry/exit criteria component 416, a project instantiation component 418, and a project tracking component 422.

The notification service component 420 provides service to send a notification to subscribed or eligible recipients such as project members and project manager when a notification request is received from the project component 410. There are in essence two types of notifications: an automatic type and an unconditional type. The automatic notification is for the notifications that are on an automatic notification list (ANL). These notifications have an enable status which can be configured or edited by the user. When it is enabled, the notification is sent at run-time when a request is received. The unconditional notification is for the notifications that are not on the ANL and are sent unconditionally. The unconditional notifications are sent at run-time when a request is received. The notification service component 420 is a stateless session bean that takes notification requests through its API. If a request is accepted, the caller will use the API to provide the XML data required for the notification. If the input data is valid, that is, it adheres to the DTD format; the notification will be constructed and sent using JavaMail and SMTP to the configured mail server.

The mail server 430 is a server having mail services capabilities to process electronic mailings (e-mails). The mail server 430 send an e-mail to the recipients upon receiving a mail message from the notification service component 420. The repository 280 contains an automatic notification list (ANL) 440 and notification information. The notification information includes information or attributes of the notification items on the ANL 440. The notification service 420 retrieves the ANL 440 and the notification information 450 from the repository 280 for viewing, editing, or creating. Initially, the ANL 440 exists as a notification template having default values or descriptors.

The notification design model 400 has the following basic features: (1) A user interface to provide the user the ability to instantiate a list of automatic notifications and their destinations; (2) Data stored in the repository provides a predefined list, e.g., ANL 440, containing typical project notifications for automation and skeleton text for all notifications; and (3) A software component that services notifications on the automatic notification list and unconditional notifications.

The advantages of the notification includes the following:

1) The ability of a user to enable or disable certain notifications from the ANL 440. This list is stored in the repository 280 and is available at project instantiation time. A user interface is provided to view the list and either "enable" or "disable" status of each of the notification elements. Enabled messages can be generated at run-time when a request is made to the notification service component.

2) The ability to service notification requests from the checklist functionality, document review functionality, entry/exit functionality, project instantiation functionality and project tracking functionality. Requests are serviced through the Notification Service API.

3) The ability to parse notification requests received in XML format and to construct the appropriate email for JavaMail Transport. This service is also provided by the notification service component 420.

4) The availability of stored skeleton text for each notification in the repository.

5) The ability to send notifications using JavaMail Simple Mail Transfer Protocol (SMTP) to the configured mail server.

Figure 5:
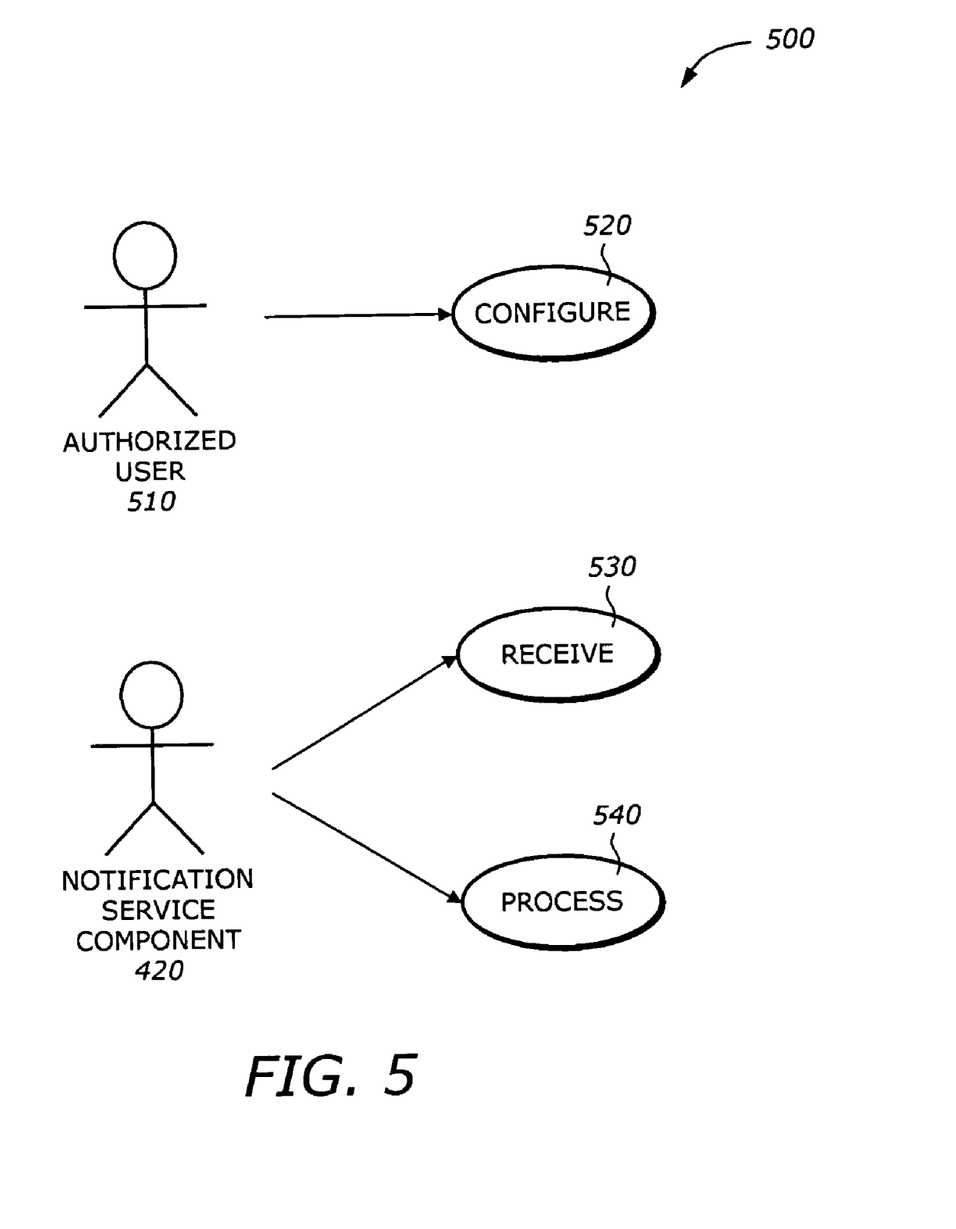
FIG. 5 is a diagram illustrating a sending notification according to one embodiment of the invention.

FIG. 5 is a diagram illustrating a sending notification 500 according to one embodiment of the invention. The sending notification 500 includes an authorized user 510, the notification service component 420, a configure function 520, a receive function 530, and a processing function 540.

The authorized user 510 is any user (e.g., project manager, project members) who is authorized to configure the notification. The configure function 520 configures a notification list and information for a project in a project management system. The notification list and information are stored in the repository 280. The receive function 530 receives a notification request from the project component 410 (shown in FIG. 4). The processing function 540 processes the notification request at run-time using the notification list and information.

Figure 6:
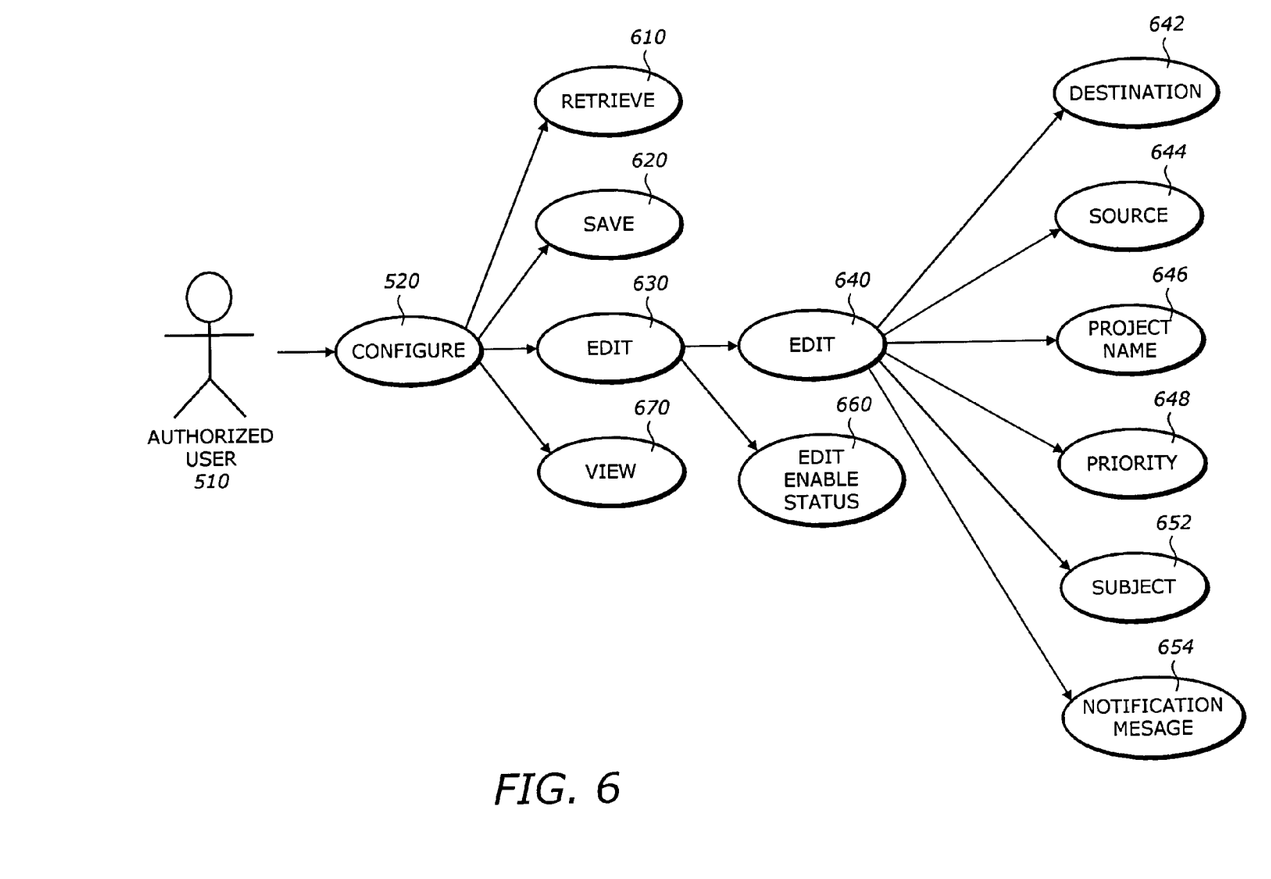
FIG. 6 is a diagram illustrating a function to configure the notification list according to one embodiment of the invention.

FIG. 6 is a diagram illustrating a function to configure the notification list according to one embodiment of the invention. The configure function 520 includes a retrieve function 610, a save function 620, an edit function 630, and a view function 670.

The retrieve function 610 retrieves the notification list and information from the repository 280. This is typically performed when the user wants to view or edit the ANL. The save function 610 saves or stores the updated, edited, or modified ANL or information in the repository 280. The edit function 630 edits the notification list and information. It allows a user to edit a notification item associated with the project component 410 on the notification list. It also provides editing an enable status for the notification item. The enable status being enabled or disabled. The edit function 630 includes an edit item function 640, and an edit enable status. The edit item function 640 includes several notification functions. These items include a destination 642, a source 644, a project name 646, a priority 648, a subject 652, and a notification message 654. The edit enable function 660 allows the user to marked a notification item to be enabled or disabled. The view function 670 allows the user to view the notification list. Authorized users may view the ANL through the user interface and toggle the checkboxes for notifications. This interface is presented as a JavaServer Page (JSP) within the Web Portal and provides the capability to check or uncheck the Enabled status for each notification. Individual notifications are also viewable through the user interface.

Figure 7:
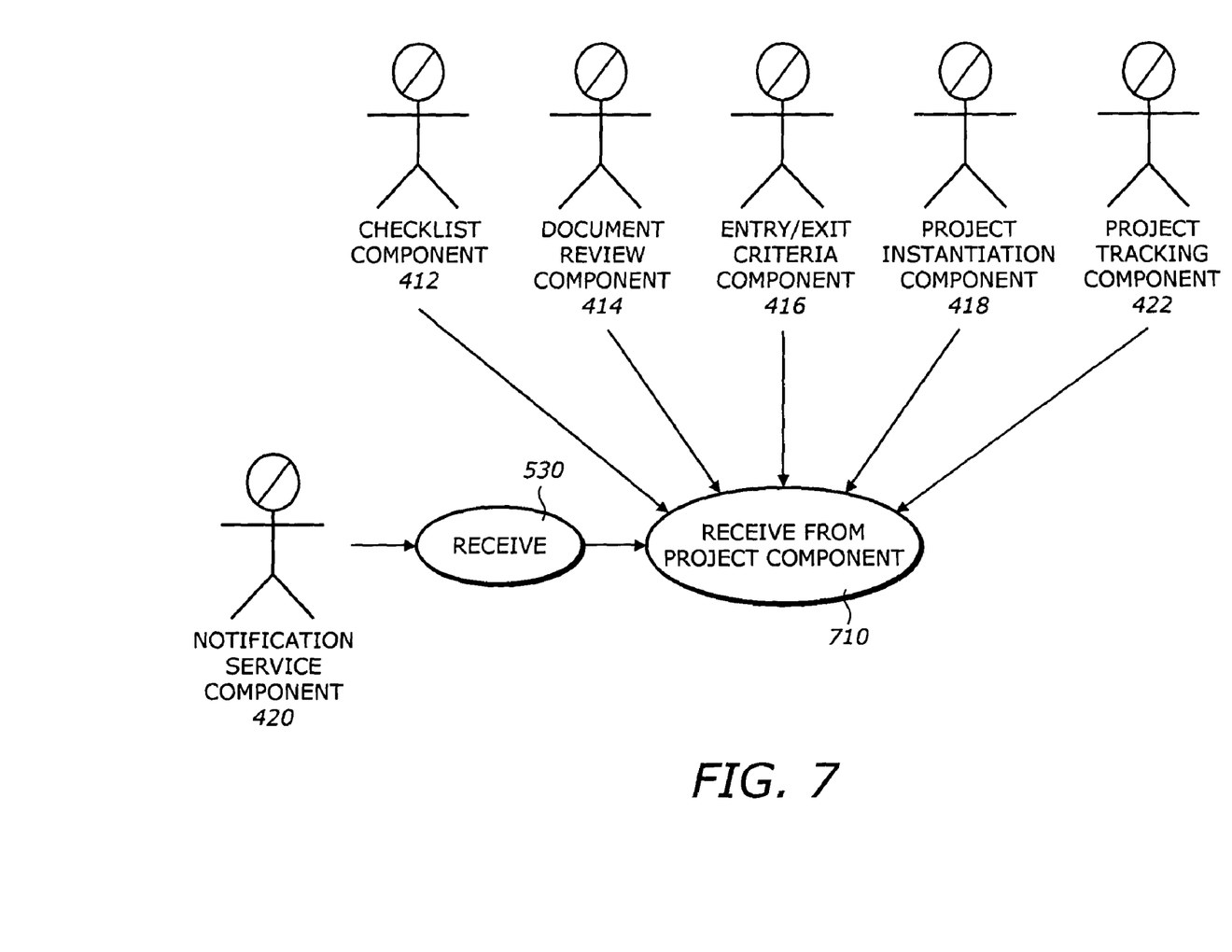
FIG. 7 is a diagram illustrating a function to receive a notification request according to one embodiment of the invention.

FIG. 7 is a diagram illustrating a function 530 to receive a notification request according to one embodiment of the invention.

The receive function 530 includes a receive from project component function 710. The receive from project component function 710 receives the notification request from at least one of the checklist component 412, the document review component 414, the exit/entry criteria component 416, the project instantiation component 418, and the project tracking component 422 as described in FIG. 4.

Figure 8:
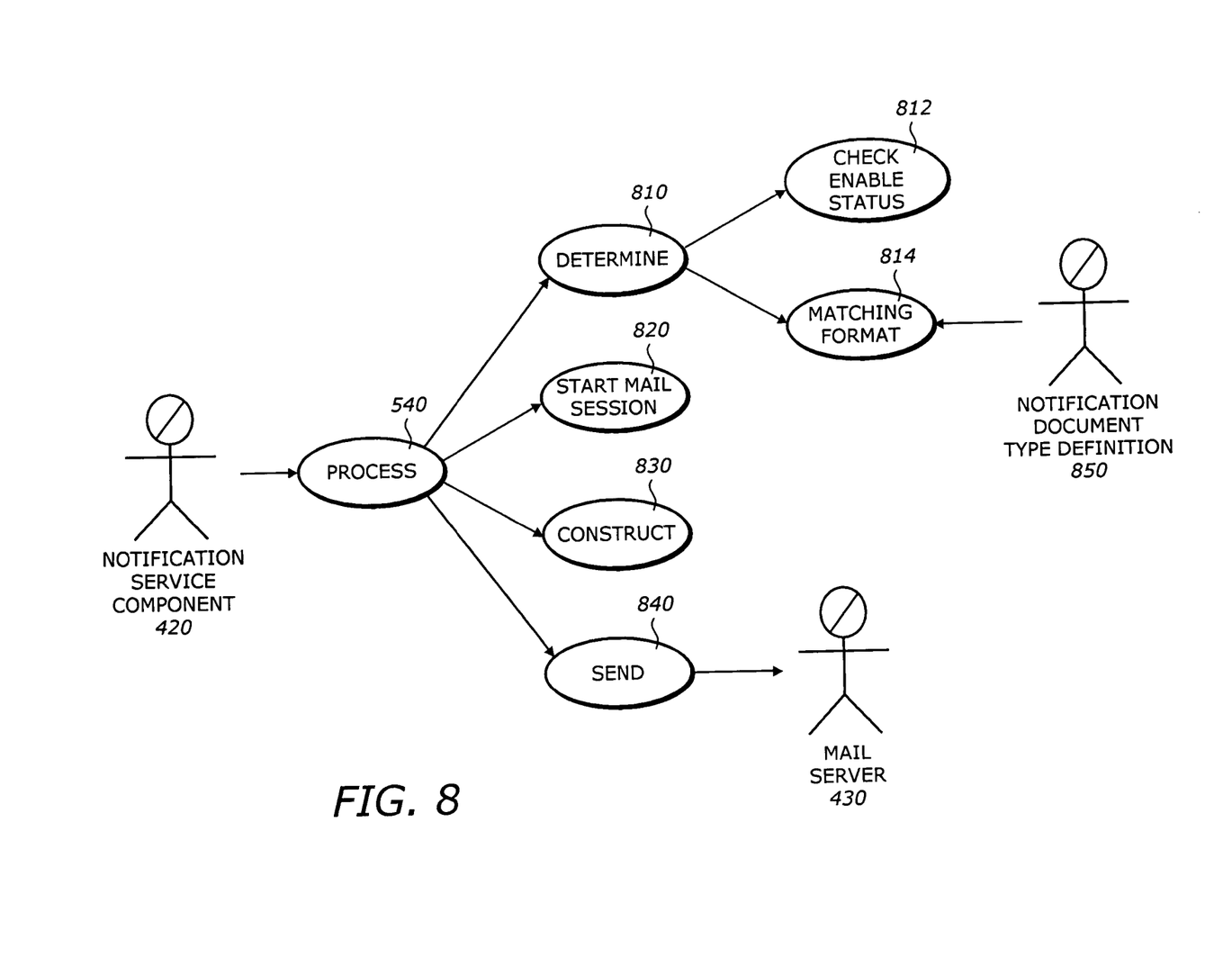
FIG. 8 is a diagram illustrating a function to process the notification request according to one embodiment of the invention.

FIG. 8 is a diagram illustrating a function 540 to process the notification request according to one embodiment of the invention. The process function 540 includes a determine function 810, a start mail session function 820, a construct function 830, and a send function 840.

As discussed above, there are two types of notification. For automatic notifications, the notification service component 420 examines the automatic notifications list for the enabled/disabled status of the notification requested. The notification will be sent to the destinations 642 specified in the automatic notification list (associated with the notification) if the following conditions are met: (1) The notification is "enabled", and (2) The XML formatted input required for construction of the notification matches the format specified by the Standard Notification Service Document Type Definition (DTD). If the notification is "disabled" or the input is not validated, the notification request will not be honored. For unconditional notifications, the notification is sent to the specified destinations if the XML formatted input required for construction of said notification matches the format specified by the Alternate Notification Service Document Type Definition (DTD). If the input is not validated, the notification request will not be honored.

The determine function 810 determines if the notification request corresponds to one of the enable status notification and an unconditional notification. It includes a check enable status function 812 which checks if the notification item is marked enabled, and a matching format function 814 which matches the notification request with a format defined by a notification document type definition 850. The automatic notification uses the standard format and the unconditional notification uses the alternate format. The start mail session 820 starts a mail session to prepare for sending the notification. The construct function 830 constructs a mail message by incorporating the notification information (e.g., destination, notification message) in the mail message. The send function 840 sends the mail message to the destination using a mail protocol, such as a JavaMail Simple Mail Transfer Protocol (SMTP) to a configured mail server.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

The invention claimed is:

1. A method comprising:
configuring a notification list and information for a notification of status of a component of a project in a project management system, the notification list and information being stored in a repository, the configuring comprising:
retrieving the notification list and information from the repository,
editing the notification list and information, the editing comprising editing a notification item associated with the component on the notification list and editing an enable status for the notification item, the enable status being one of enabled and disabled; and,
saving the edited notification in the repository;
receiving a notification request from the component in the project management system; and
processing the notification request at run-time using the notification list and information.

2. The method of claim 1 wherein editing the notification item comprises:
editing at least one of a destination, a source, a project name, a priority, a subject, and a notification message.

3. The method of claim 1 wherein configuring further comprises:
viewing the notification list and information.

4. The method of claim 1 wherein receiving the notification request comprises:
receiving the notification request from at least one of a checklist component, a document review component, an exit/entry component, a project instantiation component, and a project tracking component.

5. The method of claim 2 wherein processing the notification request comprises:
   determining if the notification request corresponds to one of the enable status notification and an unconditional notification;
   starting a mail session;
   constructing a mail message; and
   sending the mail message to the destination using a mail protocol.

6. The method of claim 5 wherein determining comprises:
   checking the enable status; and
   matching the notification request with a format defined by a notification document type definition.

7. The method of claim 1 wherein starting the mail session comprises:
   starting a JavaMail session.

8. The method of claim 6 wherein sending the mail message comprises:
   sending the mail message using a JavaMail Simple Mail Transfer Protocol (SMTP) to a configured mail server.

9. An article of manufacture comprising:
   a machine-accessible medium tangibly comprising data that, when accessed by a machine, causes the machine to perform operations comprising:
   configuring a notification list and information for a notification of status of a component of a project in a project management system, the notification list and information being stored in a repository, the configuring comprising:
      retrieving the notification list and information from the repository,
      editing the notification list and information, the editing comprising editing a notification item associated with the component on the notification list and editing an enable status for the notification item, the enable status being one of enabled and disabled; and,
      saving the edited notification in the repository;
   receiving a notification request from the component in the project management system; and
   processing the notification request at run-time using the notification list and information.

10. The article of manufacture of claim 9 wherein the data causing the machine to perform editing the notification item comprises data that, when accessed by the machine, causes the machine to perform operations comprising:
   editing at least one of a destination, a source, a project name, a priority, a subject, and a notification message.

11. The article of manufacture of claim 9 wherein the data causing the machine to perform configuring further comprises data that, when accessed by the machine, causes the machine to perform operations comprising:
   viewing the notification list and information.

12. The article of manufacture of claim 9 wherein the data causing the machine to perform receiving the notification request comprises data that, when accessed by the machine, causes the machine to perform operations comprising:
   receiving the notification request from at least one of a checklist component, a document review component, an exit/entry component, a project instantiation component, and a project tracking component.

13. The article of manufacture of claim 10 wherein the data causing the machine to perform processing the notification request comprises data that, when accessed by the machine, causes the machine to perform operations comprising:
   determining if the notification request corresponds to one of the enable status notification and an unconditional notification;
   starting a mail session;
   constructing a mail message; and
   sending the mail message to the destination using a mail protocol.

14. The article of manufacture of claim 13 wherein the data causing the machine to perform determining comprises data that, when accessed by the machine, causes the machine to perform operations comprising:
   checking the enable status; and
   matching the notification request with a format defined by a notification document type definition.

15. The article of manufacture of claim 9 wherein the data causing the machine to perform starting the mail session comprises data that, when accessed by the machine, causes the machine to perform operations comprising:
   starting a JavaMail session.

16. The article of manufacture of claim 14 wherein the data causing the machine to perform sending the mail message comprises data that, when accessed by the machine, causes the machine to perform operations comprising:
   sending the mail message using a JavaMail Simple Mail Transfer Protocol (SMTP) to a configured mail server.

17. A system comprising:
   a processor; and
   a memory coupled to the processor, the memory containing instructions that, when executed by the processor, cause the processor to:
   configure a notification list and information for a notification of status of a component of a project in a project management system, the notification list and information being stored in a repository, the configuring comprising:
      retrieving the notification list and information from the repository,
      editing the notification list and information, the editing comprising editing a notification item associated with the component on the notification list and editing an enable status for the notification item, the enable status being one of enabled and disabled; and,
      saving the edited notification in the repository;
   receive a notification request from the component in the project management system; and
   process the notification request at run-time using the notification list and information.

18. The system of claim 17 wherein the instructions causing the processor to edit the notification item comprises instructions that, when executed by the processor, cause the processor to:
   edit at least one of a destination, a source, a project name, a priority, a subject, and a notification message.

19. The system of claim 17 wherein the instructions causing the processor to configure further comprises instructions that, when executed by the processor, cause the processor to:
   view the notification list and information.

20. The system of claim 17 wherein the instructions causing the processor to receive the notification request comprises instructions that, when executed by the processor, cause the processor to:
   receive the notification request from at least one of a checklist component, a document review component, an exit/entry component, a project instantiation component, and a project tracking component.

21. The system of claim 18 wherein the instructions causing the processor to process the notification request comprises instructions that, when executed by the processor, cause the processor to:

determine if the notification request corresponds to one of the enable status notification and an unconditional notification;
start a mail session;
construct a mail message; and
send the mail message to the destination using a mail protocol.

22. The system of claim 21 wherein the instructions causing the processor to determine comprises instructions that, when executed by the processor, cause the processor to:
check the enable status; and
match the notification request with a format defined by a notification document type definition.

23. The system of claim 17 wherein the instructions causing the processor to start the mail session comprises instructions that, when executed by the processor, cause the processor to:
start a JavaMail session.

24. The system of claim 22 wherein the instructions causing the processor to send the mail message comprises instructions that, when executed by the processor, cause the processor to:
send the mail message using a JavaMail Simple Mail Transfer Protocol (SMTP) to a configured mail server.

* * * * *